US012362528B2

(12) United States Patent
Page

(10) Patent No.: US 12,362,528 B2
(45) Date of Patent: Jul. 15, 2025

(54) REPLACEABLE HOT SHOE ELECTRICAL CONNECTOR INTERPOSER

(71) Applicant: ELBIT SYSTEMS OF AMERICA, LLC, Fort Worth, TX (US)

(72) Inventor: Kenneth J. Page, Fort Worth, TX (US)

(73) Assignee: ELBIT SYSTEMS OF AMERICA, LLC, Fort Worth, TX (US)

( * ) Notice: Subject to any disclaimer, the term of this patent is extended or adjusted under 35 U.S.C. 154(b) by 379 days.

(21) Appl. No.: 17/843,255

(22) Filed: Jun. 17, 2022

(65) Prior Publication Data

US 2022/0407272 A1 Dec. 22, 2022

Related U.S. Application Data

(60) Provisional application No. 63/212,912, filed on Jun. 21, 2021.

(51) Int. Cl.

*H01R 31/06* (2006.01)
*H01R 13/52* (2006.01)
*H01R 13/24* (2006.01)
*H01R 13/621* (2006.01)

(52) U.S. Cl.

CPC ......... *H01R 31/06* (2013.01); *H01R 13/5219* (2013.01); *H01R 13/24* (2013.01); *H01R 13/621* (2013.01)

(58) Field of Classification Search

CPC .... H01R 31/06; H01R 13/5219; H01R 13/24; H01R 13/621; H01R 13/17; H01R 13/2421; H01R 13/5202

See application file for complete search history.

(56) References Cited

U.S. PATENT DOCUMENTS 7,740,499 B1 * 6/2010 Willey ...................... F41H 1/04 439/333
2008/0119089 A1 * 5/2008 Mahaffy ............ H01R 13/7197 439/620.15
2013/0128476 A1 * 5/2013 Liou .................... H01R 12/714 361/752
2013/0194769 A1 * 8/2013 Belack .................... F41A 35/00 361/807
2016/0093997 A1 * 3/2016 Eriksen ................ H01R 9/2466 439/655
2018/0328698 A1 * 11/2018 Miller ..................... F41C 23/22

* cited by examiner

*Primary Examiner* — Travis S Chambers

(74) *Attorney, Agent, or Firm* — Spencer Fane, LLP

(57) ABSTRACT

Electrical interposer devices and systems include a body and a plurality of pins. The plurality of pins are disposed within the body. The plurality of pins extend beyond a first side of the body. Similarly, the plurality of pins extend beyond a second side of the body. The plurality of pins are configured to provide electrical communication between a first electrical component and a second electrical component.

16 Claims, 7 Drawing Sheets

Equipment Mated

REPLACEABLE HOT SHOE ELECTRICAL CONNECTOR INTERPOSER

PRIORITY CLAIM AND CROSS-REFERENCE TO RELATED APPLICATIONS

This application claims priority to and the benefit of U.S. Provisional Patent Application No. 63/212,912, filed Jun. 21, 2021, titled "REPLACEABLE HOT SHOE ELECTRICAL CONNECTOR INTERPOSER," the entire contents of which are incorporated by reference herein and relied upon.

BACKGROUND

In today's battlefield, the modern soldier is equipped with a multitude of different gear modules, including survival gear, communications gear, weapons gear, and vision gear. Typically, vision gear assists the soldier in seeing long distances, seeing in the dark, and otherwise seeing things that the soldier would struggle to see with the naked eye. Some well-known examples of vision gear include hand-held targeting systems, as well as additional replaceable add-on units, such as magnification units, night vision units, and the like.

It should be appreciated that these add-on units, such as magnification units and night vision units, must be electrically coupled with the hand-held targeting system, to ensure both data communication and power transfer between the hand-held targeting system and the add-on units. The hand-held targeting system, and its add-on units, are typically carried, transported, and used, as a single device by a user. Namely, the targeting system and its add-on units are "aligned" and pointed in the same general direction. For all of these reasons, among others, cables and other flexible electrical connections are an undesirable solution for connecting the hand-held targeting system with a particular add-on unit.

At the same time, it may be undesirable for electrical connections to be disposed directly onto the components (e.g., directly onto the hand-held targeting system and the add-on unit). Namely, if either component experiences damage to its electrical connection, the entire component may require maintenance and/or replacement. This is particularly undesirable with expensive equipment, such as vision gear.

Improved electrical connector devices and systems, are therefore needed.

SUMMARY

The devices and systems disclosed herein improve on existing electrical connectors, by providing an interposed electrical connection between two physical electrical connections that are disposed directly on components, such as a hand-held targeting system and an add-on unit. The interposed electrical connection provides for direct electrical coupling between the components, eliminating the use of wires or cables, while simultaneously ensuring the components are coupled in a particular physical configuration. Moreover, the interposed electrical connection can be readily repaired or replaced, reducing the overall costs of maintenance associated with damaged electrical connections.

In light of the disclosure herein, and without limiting the scope of the invention in any way, in a first aspect of the present disclosure, which may be combined with any other aspect listed herein unless specified otherwise, an electrical interposer includes a body and a plurality of pins. The plurality of pins are disposed within the body. The plurality of pins extend beyond a first side of the body. Similarly, the plurality of pins extend beyond a second side of the body. The plurality of pins are configured to provide electrical communication between a first electrical component and a second electrical component.

In a second aspect of the present disclosure, which may be combined with any other aspect listed herein unless specified otherwise, the plurality of pins are spring-loaded pins, such that the plurality of pins are configured to deflect in an axial direction.

In a third aspect of the present disclosure, which may be combined with any other aspect listed herein unless specified otherwise, the plurality of pins are disposed in a rectangular array.

In a fourth aspect of the present disclosure, which may be combined with any other aspect listed herein unless specified otherwise, the plurality of pins are comprised of a conductive material.

In a fifth aspect of the present disclosure, which may be combined with any other aspect listed herein unless specified otherwise, the body is comprised of a non-conductive material.

In a sixth aspect of the present disclosure, which may be combined with any other aspect listed herein unless specified otherwise, the electrical interposer further includes a gasket disposed on the first side of the body.

In a seventh aspect of the present disclosure, which may be combined with any other aspect listed herein unless specified otherwise, the gasket is disposed around the plurality of pins, such that the plurality of pins reside within an interior of the gasket.

In an eighth aspect of the present disclosure, which may be combined with any other aspect listed herein unless specified otherwise, the electrical interposer further includes a plurality of apertures, wherein each of the plurality of apertures is configured to receive a fastener.

In a ninth aspect of the present disclosure, which may be combined with any other aspect listed herein unless specified otherwise, the first electrical component is a hand-held targeting unit.

In a tenth aspect of the present disclosure, which may be combined with any other aspect listed herein unless specified otherwise, the second electrical component is a secondary add-on unit providing at least one of magnification or night vision.

In an eleventh aspect of the present disclosure, which may be combined with any other aspect listed herein unless specified otherwise, an electrical interposer includes a body and a plurality of pins. The plurality of pins are disposed within the body. The plurality of pins are configured to provide electrical communication between a first electrical component and a second electrical component. The electrical interposer is removably affixed to the first electrical component such that the electrical interposer contacts the first electrical component at a first side of the electrical interposer.

In a twelfth aspect of the present disclosure, which may be combined with any other aspect listed herein unless specified otherwise, the plurality of pins extend beyond the first side of the body, and wherein the plurality of pins extend beyond a second side of the body.

In a thirteenth aspect of the present disclosure, which may be combined with any other aspect listed herein unless specified otherwise, the plurality of pins are spring-loaded pins, such that the plurality of pins are configured to deflect in an axial direction.

In a fourteenth aspect of the present disclosure, which may be combined with any other aspect listed herein unless specified otherwise, the plurality of pins are disposed in a rectangular array.

In a fifteenth aspect of the present disclosure, which may be combined with any other aspect listed herein unless specified otherwise, the plurality of pins are comprised of a conductive material, and wherein the body is comprised of a non-conductive material.

In a sixteenth aspect of the present disclosure, which may be combined with any other aspect listed herein unless specified otherwise, the electrical interposer further includes a gasket disposed on the first side of the body.

In a seventeenth aspect of the present disclosure, which may be combined with any other aspect listed herein unless specified otherwise, the gasket is disposed around the plurality of pins, such that the plurality of pins reside within an interior of the gasket.

In an eighteenth aspect of the present disclosure, which may be combined with any other aspect listed herein unless specified otherwise, the electrical interposer further includes a plurality of apertures. Each of the plurality of apertures is configured to receive a fastener for removably affixing the electrical interposer to the first electrical component.

In a nineteenth aspect of the present disclosure, which may be combined with any other aspect listed herein unless specified otherwise, the first electrical component is a hand-held targeting unit.

In a twentieth aspect of the present disclosure, which may be combined with any other aspect listed herein unless specified otherwise, the second electrical component is a secondary add-on unit providing at least one of magnification or night vision.

Additional features and advantages of the disclosed devices, systems, and methods are described in, and will be apparent from, the following Detailed Description and the Figures. The features and advantages described herein are not all-inclusive and, in particular, many additional features and advantages will be apparent to one of ordinary skill in the art in view of the figures and description. Also, any particular embodiment does not have to have all of the advantages listed herein. Moreover, it should be noted that the language used in the specification has been selected for readability and instructional purposes, and not to limit the scope of the inventive subject matter.

BRIEF DESCRIPTION OF THE FIGURES

Understanding that figures depict only typical embodiments of the invention and are not to be considered to be limiting the scope of the present disclosure, the present disclosure is described and explained with additional specificity and detail through the use of the accompanying figures. The figures are listed below.

DETAILED DESCRIPTION

It should be understood at the outset that, although illustrative implementations of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1A:
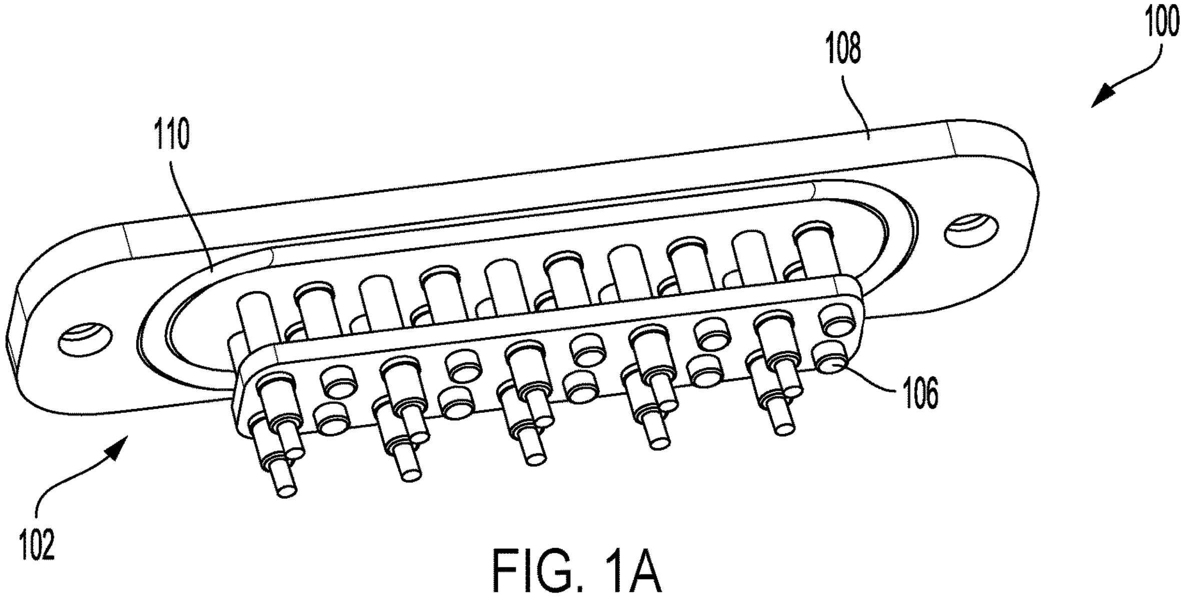
FIGS. 1A to 1B illustrate an electrical connector interposer, according to an example embodiment of the present disclosure.
Figure 1B:
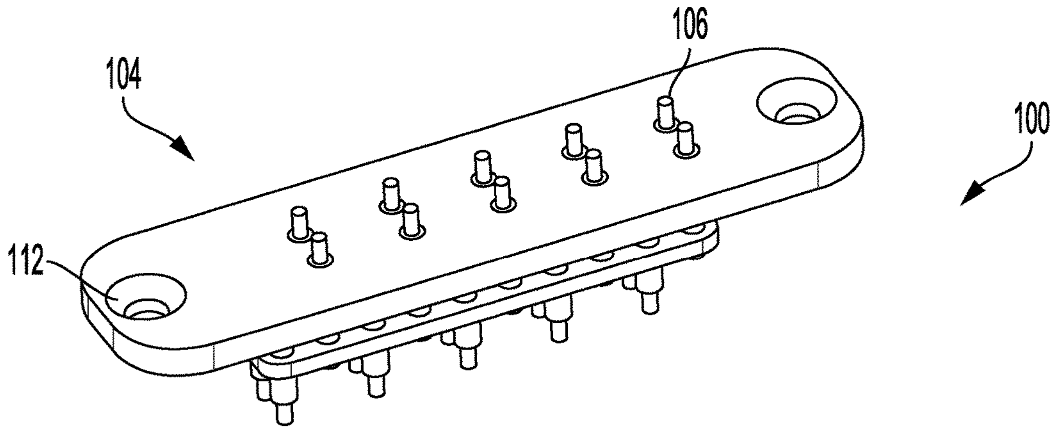

Disclosed herein are devices and systems, which may advantageously be implemented to improve connectivity, usability, and ease of maintenance for various add-on units, also referred to herein as secondary electrical components, with respect to a primary unit, also referred to herein as a primary electrical component. Specifically, FIGS. 1A to 1B illustrate multiple views of an electrical connector interposer 100 (also referred to herein more generally as interposer 100). Interposer 100 includes a first side 102 and a second side 104. In an embodiment (as disclosed in greater detail herein), first side 102 is configured to mate with a surface of a primary electrical component; similarly, second side 104 is configured to mate with a surface of a secondary electrical component. In a different embodiment, second side 104 of interposer 100 is configured to mate with the surface of the primary electrical component and first side 102 of interposer 100 is configured to mate with the surface of the secondary electrical component.

Interposer 100, as illustrated by FIGS. 1A to 1B, has a generally rectangular-shape. It should be appreciated, however, that alternative shapes of interposer 100 (e.g., square, triangular, circular, oval, and the like) are similarly contemplated herein.

Interposer 100 includes a plurality of electrical pins 106. In an embodiment, the plurality of electrical pins 106 are disposed on interposer 100 in a generally rectangular array. At least some of these electrical pins 106 extend across a body 108 of interposer 100, from the first side 102 to the second side 104. In a particular embodiment, electrical pins 106 extend beyond a plane defined by the first side 102 and extend beyond a plane defined by the second side 104.

In a particular embodiment, electrical pins 106 are constructed of metal, such as gold, gold-alloy, or any other electrically conductive material, such that electrical signals may be communicated, via pins 106, from first side 102 to second side 104 and from second side 104 to first side 102. Similarly, in a particular embodiment, body 108 is constructed of plastic, or any other non-conductive material such that electrical signals are not communicated between pins 106. In this particular embodiment, each of pins 106 is electrically isolated, via body 108. In an embodiment, pins 106 are of uniform length. In a different embodiment, at least some of pins 106 have different lengths.

In an embodiment, the plurality of electrical pins 106 are spring-loaded pins. Namely, the plurality of electrical pins 106 are configured to deflect in an axial direction in response to an external force. For example, when interposer 100 is affixed to a primary electrical component (disclosed in greater detail herein), pin 106 may deflect and provide for improved surface-to-surface sealing between interposer 100 and the primary electrical component.

Furthermore, interposer 100 may additionally include a PC board. In an example embodiment, PC board is disposed along the pins 106 (e.g., PC board may be disposed on the first side of interposer 100 between the plane defined by the first side 102 and the terminal ends of the pins 106). In a particular embodiment, single-ended pins are coupled to one another via the PC board, such that electrical signals may be communicated between pins 106, via the PC board. In an alternative embodiment, pins 106 are double ended pogo pins, such that the PC board is not necessarily needed.

Continuing on, interposer 100 may further include one or more seals 110. In an embodiment, seal 110 is a rubber gasket, configured to protect pins 106 from external elements when interposer 100 is affixed to additional hardware (as described in greater detail herein). It should be appreciated that each of first side 102 and second side 104 may include one or more seals 110.

In an embodiment, seal 110 is disposed on first side 102 of interposer 100. For example, seal 110 is disposed around the plurality of pins 106, such that the plurality of pins 106 reside within an interior defined by the seal 110. In an embodiment, seal 110 has a generally rectangular profile. It should be appreciated, however, that alternative provides of seal 110 (e.g., square, triangular, circular, oval, and the like) are similarly contemplated herein.

Interposer 110 may further include one or more fastener holes 112, each configured to receive a fastener. For example, interposer may be removably affixed to additional hardware (as described in greater detail herein) via screws, bolts, or other related fastening hardware that is inserted and/or threaded through fastener holes 112 and other holes (in the additional hardware). In another embodiment, interposer 110 may be affixed to the additional hardware in any other suitable manner (e.g., snap hook engagement, retaining clips/rings, or any other means of mechanical retention).

Figure 2:
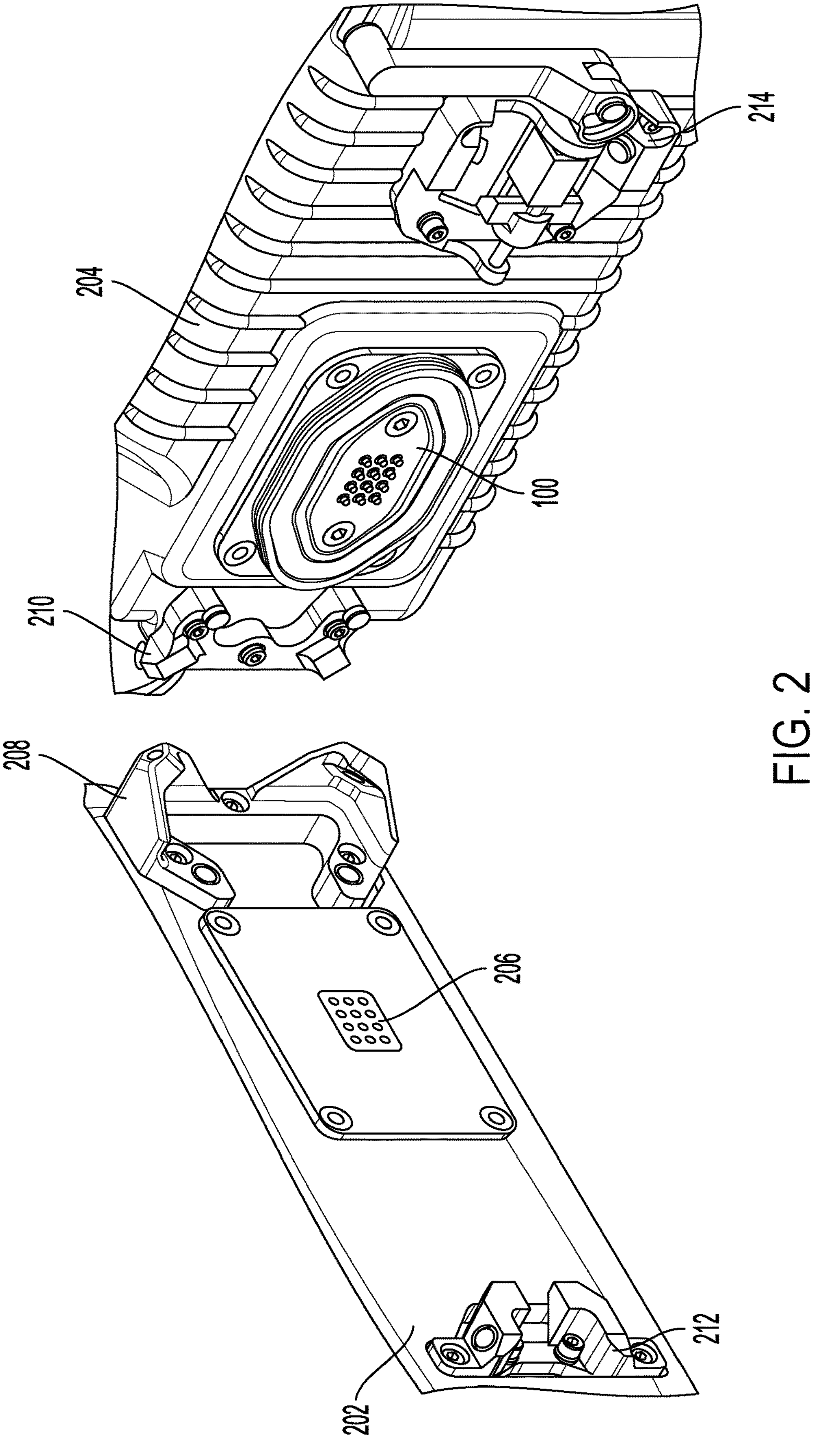
FIG. 2 illustrates an electrical connector interposer, disposed between hardware components, according to an example embodiment of the present disclosure.

Namely, FIG. 2 illustrates interposer 100 disposed between a primary unit 202 and a secondary unit 204. Specifically, for example, interposer 100 is physically coupled to the secondary unit 204 via fasteners and the fastener holes 112. It should be appreciated that, in alternate embodiments, interposer 100 is physically coupled to the primary unit 202, instead of the secondary unit 204. The plurality of pins 106 are configured to deflect at the point-of-contact with secondary unit 204 to ensure a "flush" mating between interposer 100 and secondary unit 204.

As noted previously, pins 106 are configured to extend away from the body 108 of interposer 100 on each side. Namely, once interposer 100 is physically coupled to the secondary unit 204, pins 106 contact the secondary unit 204 at the first side and pins 106 extend beyond the body 108 at the second side. On the first side of body 108, although not illustrated, pins 106 extend away from body 108 of interposer 100 and are physically arranged and configured to mate with electrical connectors that are physically disposed on the secondary unit 204. ON the second side of body 108, pins 106 are physically arranged and configured to mate with electrical connectors 206 that are physically disposed on primary unit 202.

In this way, interposer 100 functions as an electrical intermediary between the electrical connectors 206 of the primary unit 202 and the electrical connectors of the secondary unit 204. Thus, a robust electrical connection is formed between primary unit 202 and secondary unit 204, which does not require cables or wires. Seal 110 may, as previously noted, protect this electrical connection including pins 106 from external elements such as dust and water. For example, seal 110 mates with a physical surface of the primary unit 202, when the secondary unit 204 is physically coupled to the primary unit 202. Similarly, a seal mates with a physical surface of secondary unit 204 when the interposer 100 is removably coupled to the secondary unit 204.

Advantageously, if the connection between the primary unit 202 and the secondary unit 204 is damaged (i.e., if interposer 100 and/or pins 106 are damaged), the interposer 100 can be physically removed from the secondary unit 204 and either repaired or replaced; in this example, neither of the primary unit 202 nor the secondary unit 204 require any further maintenance or repair.

The primary unit 202 may include a primary alignment fiducial 208; the secondary unit 204 may include a primary alignment fiducial 210. These primary alignment fiducials 208, 210 may advantageously improve the mechanical coupling (and thus the pin-to-pin alignment and electrical connectivity) between the primary unit 202 and secondary unit 204 via interposer 100. Similarly, the primary unit 202 may include a secondary alignment fiducial 212, such as a latch strike plate; the secondary unit 204 may include a secondary alignment fiducial 214, such as a latch. These secondary alignment fiducials 212, 214 may, likewise, advantageously improve the mechanical coupling (and thus the pin-alignment and electrical connectivity) between the primary unit 202 and secondary unit 204.

In an example, the primary unit 202 may be a hand-held targeting unit. In other examples, the primary unit 202 may be any other suitable electrical component. In an example, the secondary unit 204 may be an external laser and/or provide one or more of night vision and magnification. In other examples, the secondary unit 204 may be any suitable electrical component, for example, that provides additional targeting capabilities or features. In an example, the primary unit 202 and/or the secondary unit 204 may be a connecting unit of an electrical component, which allows the electrical component (e.g., having the primary unit 202) to be electrically connected to another electrical component (e.g., having the secondary unit 204), for example, via the interposer 100.

In another example embodiment, the primary unit 202 may be configured for electrical communication with several secondary units 204. For example, primary unit 202 may be physically coupled with secondary unit 204 and, upon removal of secondary unit 204, may be physically coupled with another secondary unit. Likewise, for example, primary unit 202 may be physically coupled with secondary unit 204 and, simultaneously, may be physically coupled with another secondary unit via a different interface with a different interposer.

Figure 3:
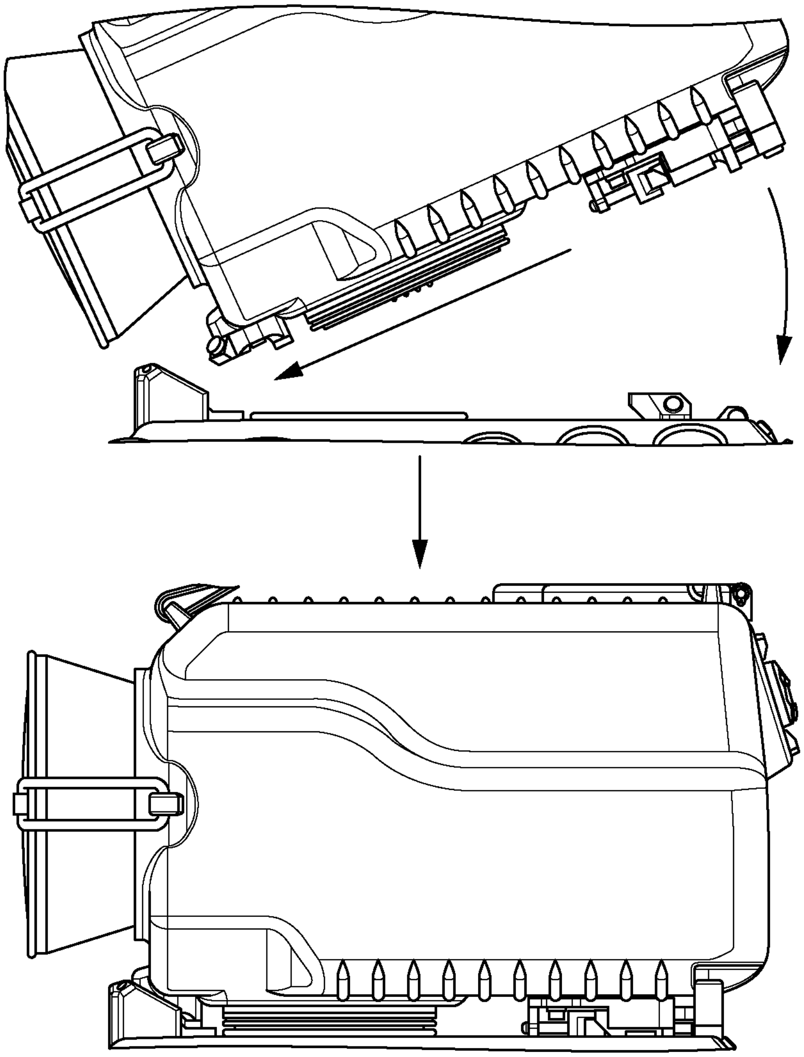
FIG. 3 illustrates the coupling of hardware components, according to an example embodiment of the present disclosure.

FIG. 3 illustrates the mechanical coupling of the primary unit 202 and secondary unit 204 as operable with primary alignment fiducials 208, 210 and secondary alignment fiducials 212, 214. As it should be appreciated, once mechanically coupled, the primary unit 202 and secondary unit 204 are in electrical communication with one another via interposer 100.

Figure 4:
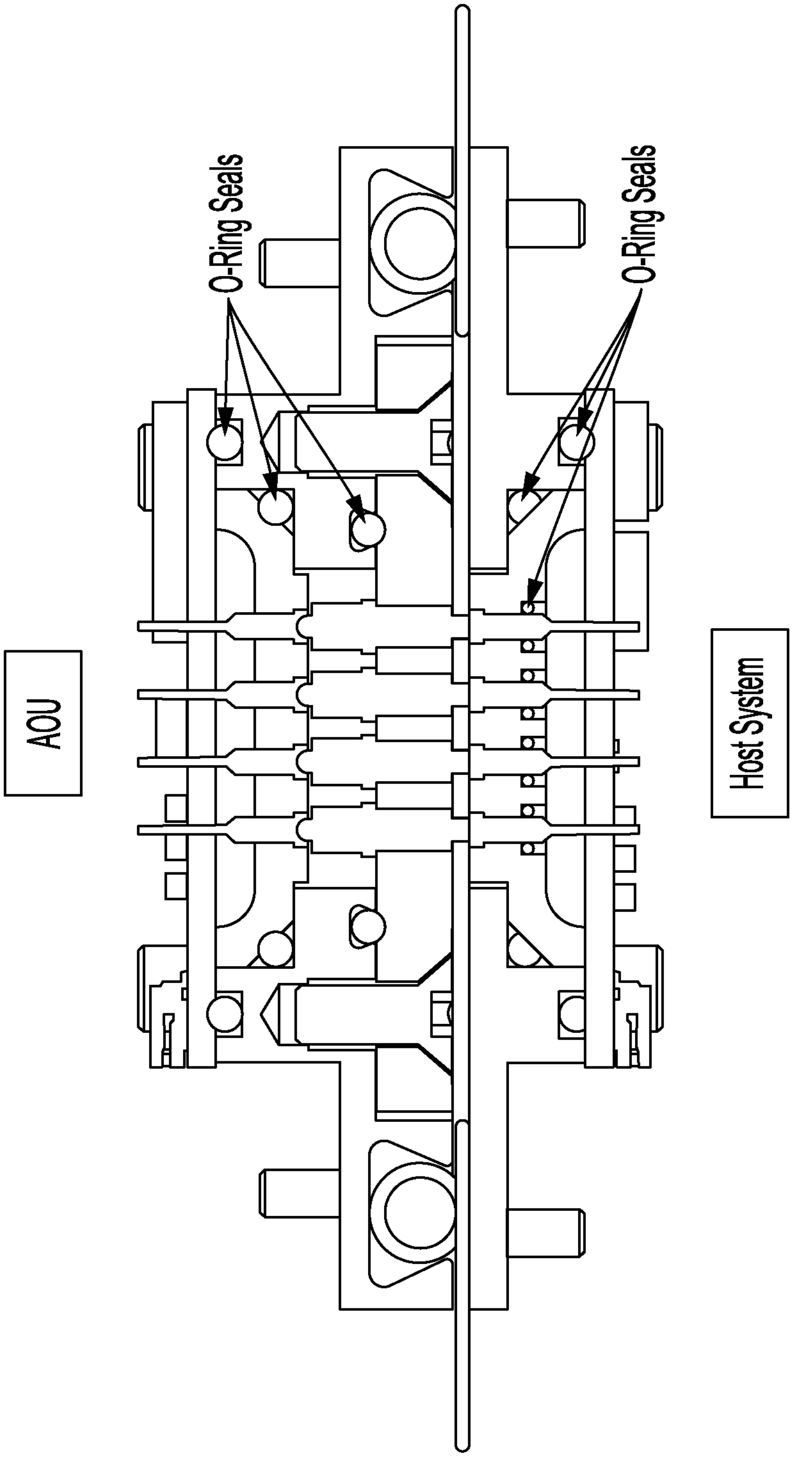
FIGS. 4 to 7 illustrate cross-sectional schematics of electrical connector interposers, including electrical connections with various hardware components, according to example embodiments of the present disclosure.

FIGS. 4 to 7 illustrate schematics of electrical connector interposer 100, including the specific electrical connections with primary unit 202 and secondary unit 204. For example, FIG. 4 illustrates an interposer disposed between a primary unit 202 (e.g., a host system) and a secondary unit 204 (e.g., add-on unit or AOU). In an embodiment, the interposer is bounded by a 30 W power requirement. For example, the secondary unit 204 may be configured for 24 volt DC power (e.g., 8× 3V CR123 cells) with 2 amps maximum (e.g., 30W @ 15 VDC). Interposer may be configured for bi-directional power sharing between primary unit 202 and secondary unit 204. In an embodiment, interposer supports identification signals, such as AOU supplied power, communication interfaces, power, and the like.

The interposer 100 illustrated by FIG. 4 further includes spring-loaded pins and multiple o-ring seals.

Figure 5:
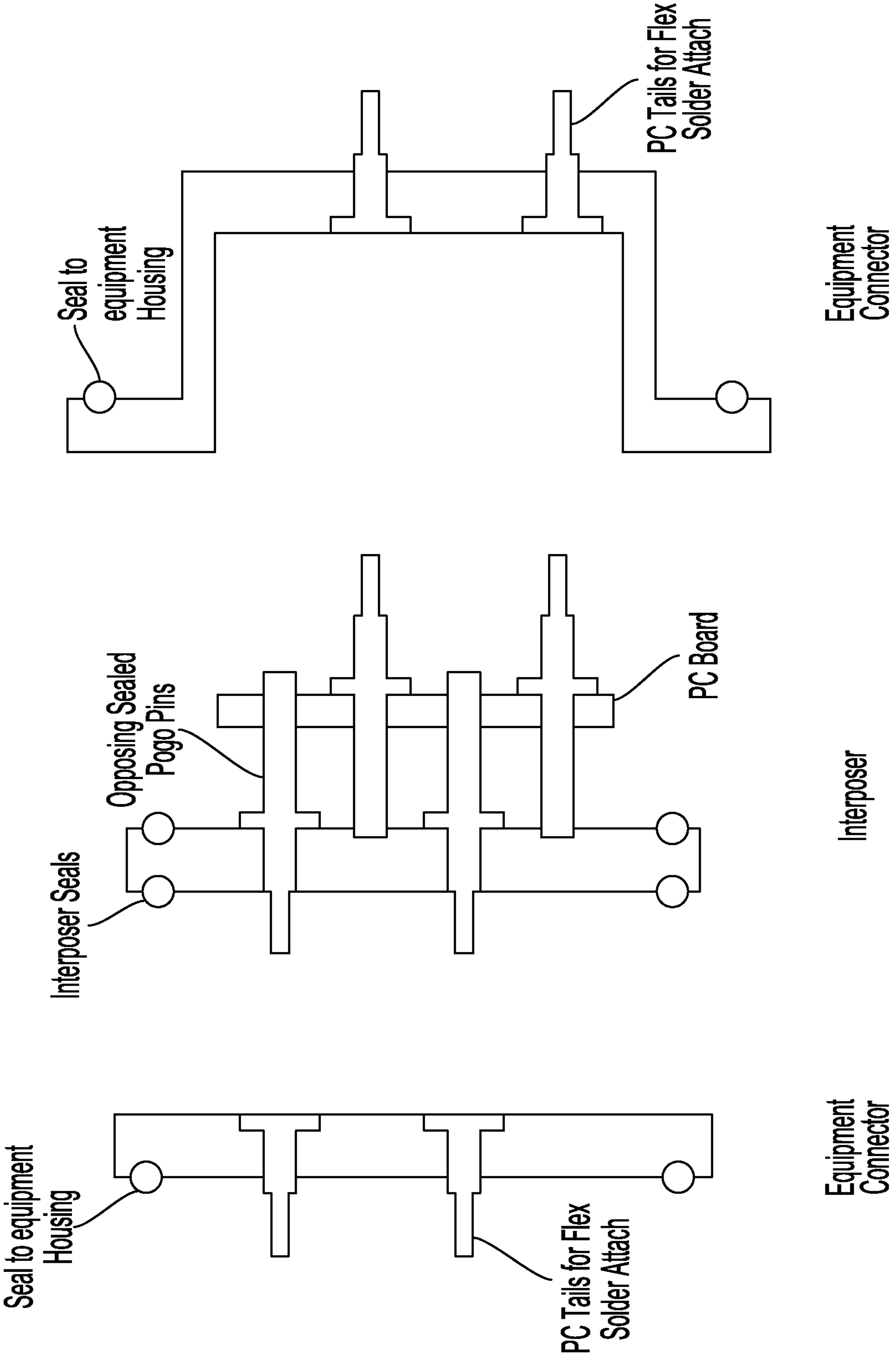

FIG. 5 illustrates that interposer may utilize pogo pins 106 for axial deflection. Advantageously, interposer 100 does not include moving parts, enabling high-reliability by reducing the risks associated with electrical connector damage. Interposer 100 is further configured with extended pins 106, such that the equipment (e.g., primary unit 202 and secondary unit 204) may include flush outer surfaces. Interposer 100 may further allow for tolerance associated with misalignment, which negates the need for precision locating features.

Figure 6:
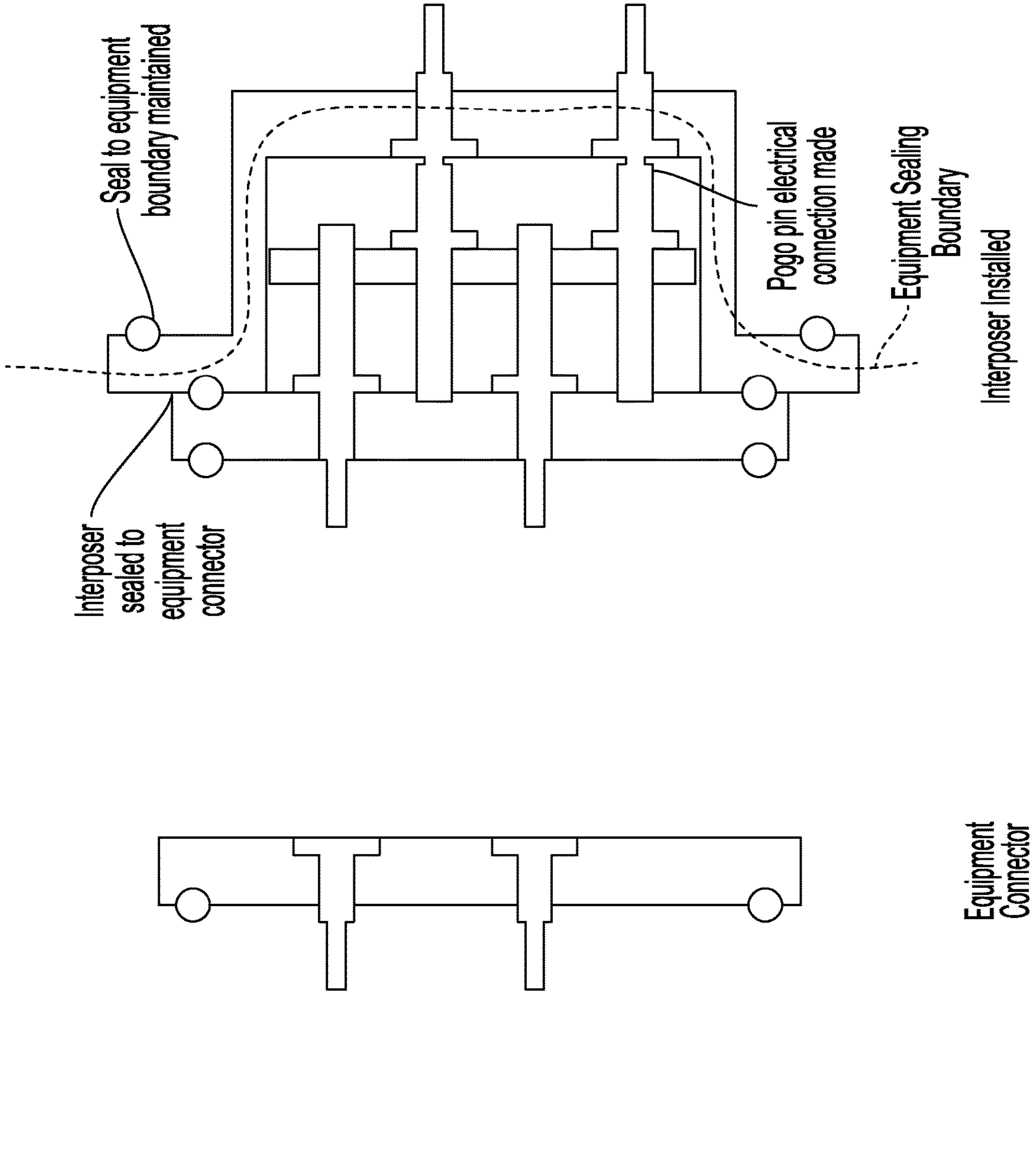

FIG. 6 illustrates the installation and removal of interposer 100 with additional equipment. In an embodiment, interposer 100 is configured for clip-in attachment for removable coupling with equipment (e.g., secondary unit 204). In another embodiment, interposer 100 is configured for screw-in attachment via fasteners with apertures 112 for removable coupling with equipment (e.g., secondary unit 204). Interposer 100 can be a discrete component or, alternatively, may be integrally molded into a plastic equipment housing. As disclosed herein, installation and removal of the interposer 100 does not violate the integrity of sealed precision equipment (e.g., primary unit 202 and secondary unit 204).

Figure 7:
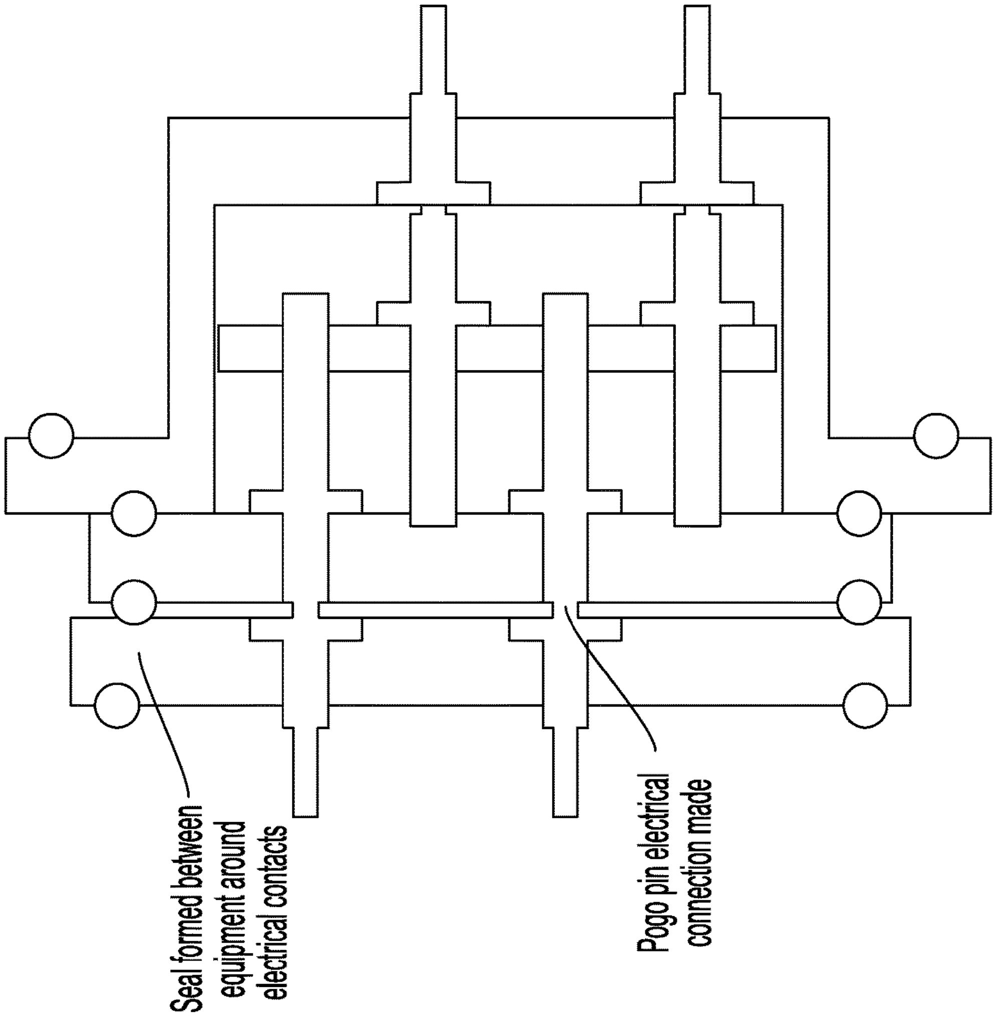

FIG. 7 illustrates the interposer 100 coupled with two pieces of equipment (e.g., primary unit 202 and secondary unit 204), thus forming an environmental seal around the electrical contact between these pieces of equipment.

While the disclosure herein generally relates to an interposer 100 disposed between a primary unit 202 and a secondary unit 204, it should be appreciated that interposer 100 could be implemented in any electrical-communication applications whereby electrical connectivity is required between discrete components. In an alternative embodiment, interposer 100 is coupled to an end of a cable, as opposed to directly onto a component.

From the description provided herein, those skilled in the art are readily able to combine software with appropriate general-purpose or special-purpose computer hardware to create a computer system and/or computer subcomponents in accordance with the various embodiments and methods.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

As used in this specification, including the claims, the term "and/or" is a conjunction that is either inclusive or exclusive. Accordingly, the term "and/or" either signifies the presence of two or more things in a group or signifies that one selection may be made from a group of alternatives. As used here, "at least one of," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, C, and C together.

Without further elaboration, it is believed that one skilled in the art can use the preceding description to utilize the claimed inventions to their fullest extent. The examples and embodiments disclosed herein are to be construed as merely illustrative and not a limitation of the scope of the present disclosure in any way. It will be apparent to those having skill in the art that changes may be made to the details of the above-described embodiments without departing from the underlying principles discussed. In other words, various modifications and improvements of the embodiments specifically disclosed in the description above are within the scope of the appended claims. For example, any suitable combination of features of the various embodiments described is contemplated.

Note that elements recited in means-plus-function format are intended to be construed in accordance with 35 U.S.C. § 112 ¶ 6. The scope of the invention is therefore defined by the following claims. Persons of ordinary skill in the art may understand that all or some of the steps of the methods in the embodiments may be implemented by a program instructing relevant hardware (such as a processor). The program may be stored in a computer readable storage medium. The storage medium may include a read-only memory (ROM), a random access memory (RAM), a magnetic disk, or an optical disc.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

The invention is claimed as follows:

1. An electrical interposer, comprising:

a body;

a plurality of pins, disposed within the body, wherein the plurality of pins are configured to provide electrical communication between a first electrical component and a second electrical component, and wherein the electrical interposer is removably affixed to the first electrical component such that the electrical interposer contacts the first electrical component at a first side of the electrical interposer;

a PC board, disposed on the first side between a plane defined by the first side and terminal ends of the plurality of pins; and a plurality of apertures, wherein each of the plurality of apertures is configured to receive a fastener for removably affixing the electrical interposer to the first electrical component.

2. The electrical interposer of claim 1, wherein the plurality of pins extend beyond the first side of the body, and wherein the plurality of pins extend beyond a second side of the body.

3. The electrical interposer of claim 1, wherein the plurality of pins are spring-loaded pins, such that the plurality of pins are configured to deflect in an axial direction.

4. The electrical interposer of claim 1, wherein the plurality of pins are disposed in a rectangular array.

5. The electrical interposer of claim 1, wherein the plurality of pins are comprised of a conductive material, and wherein the body is comprised of a non-conductive material.

6. The electrical interposer of claim 1, further comprising a gasket disposed on the first side of the body.

7. The electrical interposer of claim 6, wherein the gasket is disposed around the plurality of pins, such that the plurality of pins reside within an interior of the gasket.

8. The electrical interposer of claim 1, wherein the first electrical component is a hand-held targeting unit.

9. The electrical interposer of claim 1, wherein the second electrical component is a secondary add-on unit providing at least one of magnification or night vision.

10. An electrical interposer, comprising:

a body;

a plurality of pins, disposed within the body;

wherein the plurality of pins are configured to provide electrical communication between a first electrical component and a second electrical component;

wherein the first electrical component is a hand-held targeting unit;

wherein the second electrical component is a secondary add-on unit providing at least one of magnification or night vision; and wherein the electrical interposer is removably affixed to the first electrical component such that the electrical interposer contacts the first electrical component at a first side of the electrical interposer;

a PC board, disposed on the first side between a plane defined by the first side and terminal ends of the plurality of pins; and a plurality of apertures, wherein each of the plurality of apertures is configured to receive a fastener for removably affixing the electrical interposer to the first electrical component.

11. The electrical interposer of claim 10, wherein the plurality of pins extend beyond the first side of the body, and wherein the plurality of pins extend beyond a second side of the body.

12. The electrical interposer of claim 10, wherein the plurality of pins are spring-loaded pins, such that the plurality of pins are configured to deflect in an axial direction.

13. The electrical interposer of claim 10, wherein the plurality of pins are disposed in a rectangular array.

14. The electrical interposer of claim 10, wherein the plurality of pins are comprised of a conductive material, and wherein the body is comprised of a non-conductive material.

15. The electrical interposer of claim 10, further comprising a gasket disposed on the first side of the body.

16. The electrical interposer of claim 15, wherein the gasket is disposed around the plurality of pins, such that the plurality of pins reside within an interior of the gasket.

* * * * *